United States Patent
Wei et al.

(10) Patent No.: US 12,190,837 B2
(45) Date of Patent: Jan. 7, 2025

(54) SCREEN FLICKER DEBUGGING METHOD, APPARATUS AND SYSTEM OF DISPLAY PANEL

(71) Applicant: HKC CORPORATION LIMITED, Shenzhen (CN)

(72) Inventors: Shixin Wei, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/212,205

(22) Filed: Jun. 21, 2023

(65) Prior Publication Data
US 2024/0312424 A1 Sep. 19, 2024

(30) Foreign Application Priority Data
Mar. 13, 2023 (CN) .......................... 202310290542.6

(51) Int. Cl.
*G09G 3/36* (2006.01)
*G01J 11/00* (2006.01)
(Continued)

(52) U.S. Cl.
CPC ................. *G09G 3/36* (2013.01); *G01J 11/00* (2013.01); *G09G 3/2096* (2013.01);
(Continued)

(58) Field of Classification Search
CPC ......... G09G 2320/0247; G09G 3/3648; G09G 2320/0257; G09G 2340/0435;
(Continued)

(56) References Cited

U.S. PATENT DOCUMENTS

| 11,004,369 B2 * | 5/2021 | Li | G09G 3/3648 |
| 2004/0252115 A1 * | 12/2004 | Boireau | G09G 3/3611 |
| | | | 345/211 |
| 2008/0273000 A1 * | 11/2008 | Park | G09G 3/006 |
| | | | 345/89 |

(Continued)

FOREIGN PATENT DOCUMENTS

| CN | 102708821 A | 10/2012 |
| CN | 111369925 A | 7/2020 |

(Continued)

OTHER PUBLICATIONS

International Search Report, International Application No. PCT/CN2023/095888, mailed Oct. 6, 2023 (15 pages).

*Primary Examiner* — Dismery Mercedes

(57) ABSTRACT

The present application provides a screen flicker debugging method of a display panel, an apparatus and a system. The display panel includes a first common voltage and a second common voltage. The voltage difference between the second common voltage and the first common voltage is configured as a reference voltage for deflection of the liquid-crystal molecules. The screen flicker debugging method of the display panel includes: acquiring a refresh rate interval of the display panel, and determining a minimum refresh rate; controlling the display panel to display a flickering picture with the minimum refresh rate; adjusting the reference voltage and acquiring flickering values of the flickering picture at different reference voltages; and determining the minimum flickering value and setting the corresponding reference voltage as the optimal reference voltage for the display panel. The flickering phenomenon of the display panel at high and low refresh rates is reduced.

11 Claims, 3 Drawing Sheets

(51) Int. Cl.
*G09G 3/20* (2006.01)
*G09G 3/3291* (2016.01)

(52) U.S. Cl.
CPC ......... *G09G 3/3291* (2013.01); *G09G 3/3648* (2013.01); *G09G 3/3655* (2013.01); *G09G 3/3696* (2013.01); *G09G 2300/0819* (2013.01); *G09G 2320/0247* (2013.01); *G09G 2320/0257* (2013.01); *G09G 2320/043* (2013.01); *G09G 2340/0435* (2013.01)

(58) Field of Classification Search
CPC .... G09G 2360/16; G09G 3/3696; G09G 3/36; G09G 1/146; G09G 3/2096; G09G 3/3688; G09G 2320/103; G09G 2320/0233; G09G 2320/02; G09G 3/3291; G09G 2300/0819; G09G 3/3655; G09G 3/3266; G09G 2320/043; G09G 2320/06; G09G 3/20; G09G 2320/0266
See application file for complete search history.

(56) References Cited

U.S. PATENT DOCUMENTS

| | | | |
|---|---|---|---|
| 2015/0332650 A1* | 11/2015 | Saitoh | G09G 3/3685 345/204 |
| 2016/0042707 A1 | 2/2016 | Wang et al. | |
| 2016/0351139 A1* | 12/2016 | Syu | G09G 3/2011 |
| 2019/0096343 A1* | 3/2019 | Hou | G09G 3/3655 |
| 2019/0244576 A1* | 8/2019 | Kwak | G09G 3/3655 |
| 2019/0325830 A1* | 10/2019 | Chen | G09G 3/3696 |
| 2020/0160801 A1* | 5/2020 | Wang | H04N 1/4078 |

FOREIGN PATENT DOCUMENTS

| | | |
|---|---|---|
| CN | 112102769 A | 12/2020 |
| CN | 110751933 B | 9/2021 |
| CN | 113808515 A | 12/2021 |
| CN | 114664268 A | 6/2022 |
| CN | 115731889 A | 3/2023 |
| CN | 115731896 A | 3/2023 |

\* cited by examiner

SCREEN FLICKER DEBUGGING METHOD, APPARATUS AND SYSTEM OF DISPLAY PANEL

CROSS REFERENCE TO RELATED APPLICATIONS

The present application is based on the Chinese Patent Application No. 202310290542.6 filed on Mar. 13, 2023 and claims priority thereof. The entire contents of the Chinese application are hereby incorporated by reference in their entireties.

TECHNICAL FIELD

The present application relates to the field of display technologies, in particularly to a screen flicker debugging method of a display panel, a screen flicker debugging apparatus of a display panel and a screen flicker debugging system of a display panel.

BACKGROUND

With booming development of e-sports in recent years, game players have growing demand for e-sport devices, and various leading brands have launched gaming monitors with high refresh rates as their primary products. For a gaming monitor, whether the picture is fluid and smooth under a high refresh rate is an important criterion to test the performance of the monitor. When the frame number output from the graphics card does not match with the refresh rate, there will be screen delay, stagnation, picture tearing, which seriously affects gaming experience of a consumer. To alleviate this kind of phenomenon, graphics-card manufacturers have developed adaptive vertical synchronization technology/dynamic refresh rate (DRR), among which the most widely used are the FreeSync technology from AMD and the G-SYNC technology from NVIDIA.

The adoption of FreeSync/G-SYNC technologies has enhanced the synchronization of frame number of pictures and high refresh rates to a certain extent, bringing a more fluid and smooth gaming experience to e-sports players. However, in some cases, the monitor with the FreeSync/G-SYNC function enabled may suffer from the phenomenon of screen flicker, which may seriously affect the gaming and watching experience.

SUMMARY

The main technical problem solved by the present application is to provide a screen flicker debugging method for a display panel, a screen flicker debugging apparatus of a display panel and a screen flicker debugging system of a display panel, to solve the problem of screen flicker of a monitor in the related art.

To solve the above-mentioned technical problem, a first technical scheme adopted by the present application is to provide a screen flicker debugging method for a display panel. The display panel includes a first common voltage and a second common voltage. A voltage difference between the second common voltage and the first common voltage is configured as a reference voltage for deflection of liquid-crystal molecules. The method includes: acquiring a refresh rate interval of the display panel, and determining a minimum refresh rate: controlling the display panel to display a flickering picture at the minimum refresh rate: adjusting the reference voltage, and acquiring a flickering value of the flickering picture at different reference voltages; and determining a minimum flickering value, and setting the corresponding the reference voltage as an optimal reference voltage for the display panel.

In some embodiment, the adjusting the reference voltage, and acquiring the flickering value of the flickering picture at different reference voltages includes: keeping the second common voltage constant, adjusting the first common voltage, and acquiring the flickering value of the flickering picture at different reference voltages. The first common voltage is a common voltage of a color film substrate of the display panel, and the second common voltage is the common voltage of an array substrate of the display panel.

In some embodiments, after the determining the minimum flickering value, and setting corresponding reference voltage as the optimal reference voltage for the display panel, the method further includes: adjusting the reference voltage to be greater than or equal to 3V.

In some embodiments, the adjusting the reference voltage to be greater than or equal to 3V includes: keeping the first common voltage corresponding to the optimal reference voltage constant, adjusting the second common voltage, and making the reference voltage to be greater than or equal to 3V. The first common voltage is the common voltage of the color film substrate of the display panel, and the second common voltage is the common voltage of the array substrate of the display panel.

In some embodiments, the second common voltage is adjusted when the display panel displays a normal picture during a power-on process.

In some embodiments, the first common voltage ranges from 4V to 6V, and the second common voltage ranges from 9.8V to 12V.

In some embodiments, the acquiring the refresh rate interval of the display panel, and determining the minimum refresh rate includes: acquiring the refresh rate interval of the display panel. A minimum value of the refresh rate interval is the minimum refresh rate.

In some embodiments, the refresh rate interval includes any of 35 Hz~240 Hz, 21 Hz~144 Hz, 17 Hz~120 Hz, 9 Hz~60 Hz and 48 Hz~144 Hz.

To solve the above-mentioned technical problem, a second technical solution adopted by the present disclosure is to provide a screen flicker debugging apparatus for a display panel. The apparatus includes: an acquiring module, a display control module, an adjusting module and a determining module. The acquiring module is configured for acquiring a first common voltage and a second common voltage of the display panel. A voltage difference between the second common voltage and the first common voltage is configured as a reference voltage for deflection of liquid-crystal molecules. The acquiring module is further configured for acquiring a refresh rate interval of the display panel, and acquiring flickering values of a flickering picture at different reference voltages. The display control module is configured for controlling the display panel to display the flickering picture at a minimum refresh rate. The adjusting module is configured for adjusting the reference voltage. The determining module is configured for determine a minimum refresh rate, and further configured for determining the minimum flickering value and setting the corresponding reference voltage as an optimal reference voltage for the display panel.

To solve the above-mentioned technical problem, a third technical solution adopted by the present disclosure is to provide a screen flicker debugging system for a display panel. The system includes an optical test instrument and a host controller. The optical test instrument is configured for calculating a flickering value of the display panel. The host controller is configured for performing the above-mentioned screen flicker debugging method for the display panel.

The beneficial effect of the present application is that, differing from the related art, the present application provides the screen flicker debugging method for the display panel, the apparatus and the system. The display panel includes the first common voltage and the second common voltage. The voltage difference between the second common voltage and the first common voltage is configured as the reference voltage for the deflection of liquid-crystal molecules. The screen flicker debugging method of the display panel includes: acquiring the refresh rate interval of the display panel, and determining the minimum refresh rate; controlling the display panel to display the flickering picture at the minimum refresh rate; adjusting the reference voltage to acquire the flickering value of the flickering picture at different reference voltages; and determining the minimum flickering value and setting the corresponding reference voltage as the optimal reference voltage for the display panel. The reference voltage corresponding to the minimum flickering value of the flickering picture with the most severe flickering of the displayed picture (i.e., the flickering picture displayed at the minimum refresh rate) is set as the optimal reference voltage, such that the flickering phenomenon of the display panel of the flickering picture with the most severe flickering is reduced, and the flickering phenomenon of the display panel at high and low refresh rates is reduced.

BRIEF DESCRIPTION OF THE DRAWINGS

In order to more clearly illustrate technical solutions in the present application, the drawings required in the description of the embodiments will be briefly introduced below. Obviously, the drawings in the following description are only some embodiments of the present disclosure. For those of ordinary skills in the art, other drawings could be obtained based on these drawings without creative efforts.

Figure 1:
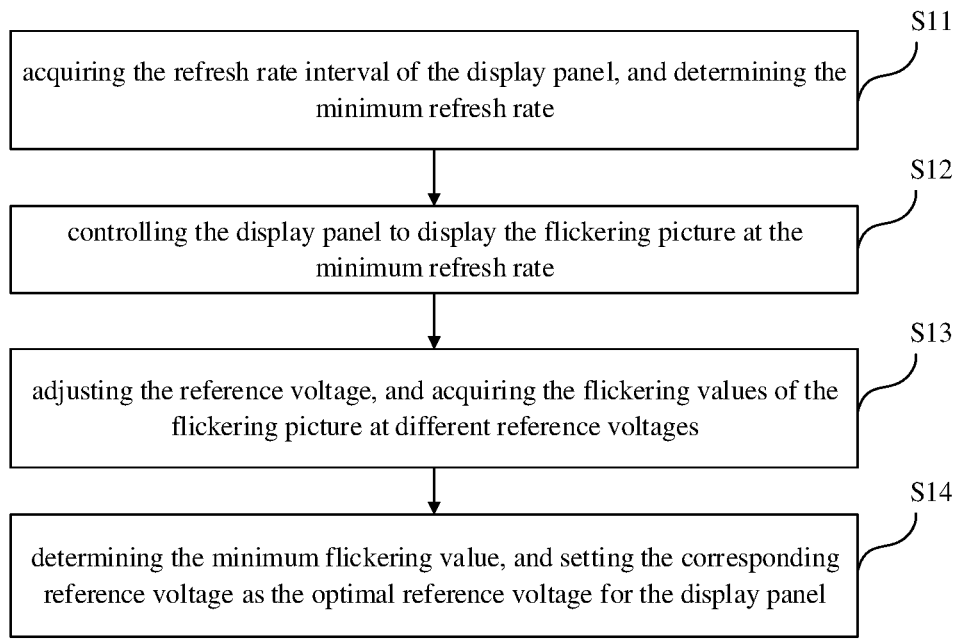
FIG. 1 is a schematic flowchart of a screen flicker debugging method of a display panel according to a first embodiment of the present application.

REFERENCE NUMBERS the screen flicker debugging apparatus for the display panel—100, the acquiring module—10, the adjusting module—20, the display control module—30, the determining module—40, the screen flicker debugging system for the display panel—200, the optical test instrument—201, the host controller—202, the timing controller—203, the display panel—204, the charging stage—Q1, the normal-picture display stage—Q2, the first common voltage—CFcom, the second common voltage—Acom, the clock signal—CK, the output signal—Sout out.

DETAILED DESCRIPTION

The technical scheme of embodiments of the present application is described in detail below in conjunction with the accompanying drawings.

In the following description, specific details such as particular system structures, interfaces, techniques, etc. are presented for the purpose of illustration and not for the purpose of limitation, in order to facilitate a thorough understanding of the present application.

Technical solutions in embodiments of the present disclosure will be described clearly and thoroughly in connection with accompanying drawing of the embodiments of the present disclosure. Obviously, the described embodiments are only a part of the embodiments, but not all of them. All other embodiments by a person of ordinary skills in the art based on embodiments of the present disclosure without creative efforts should all be within the protection scope of the present disclosure.

The terms 'first', 'second', and 'third' in the present application are only for the purpose of description, and cannot be construed as indicating or implying relative importance or implicitly indicating the number of technical features referred to. Therefore, the features defined with 'first', 'second', and 'third' may explicitly or implicitly include at least one of the features. In the description of the present application, 'a plurality of' means at least two, such as two, three, etc., unless otherwise specifically defined. All directional indicators (such as up, down, left, right, front, back . . . ) in embodiments of the present application are only used to explain a motion state, a relative positional relationship between the components in a specific posture (as shown in the drawings). If the specific posture changes, then the directional indication will change accordingly. In addition, the terms 'include', 'comprise' and any variations thereof are intended to cover non-exclusive inclusion. For example, a process, a method, a system, a product or a device that includes a series of operations or units is not limited to the listed operations or units, but alternatively includes unlisted operations or units, or alternatively also includes other operations or units inherent to these processes, methods, products or devices.

Reference to 'embodiments' herein means that a specific feature, structure, or characteristic described in conjunction with the embodiments may be included in at least one embodiment of the present application. The presence of this phrase in various places in the specification does not necessarily refer to the same embodiment, nor is it an independent or candidate embodiment mutually exclusive with other embodiments. Those skilled in the art may explicitly and implicitly understand that, the embodiments described herein may be combined with other embodiments.

As shown in FIG. 1, FIG. 1 is a schematic flowchart of a screen flicker debugging method of a display panel provided according to a first embodiment of the present application.

The present application provides the screen flicker debugging method of the display panel. The display panel includes a first common voltage and a second common voltage. A voltage difference between the second common voltage and the first common voltage is configured as a reference voltage for deflection of the liquid-crystal molecules.

The display panel is a liquid-crystal display panel. The display panel includes a color film substrate and an array substrate arranged oppositely to each other and liquid-crystal molecules arranged between the array substrate and the color film substrate. One of the first common voltage and the second common voltage is a common voltage of the color film substrate in the display panel, and the other one is the common voltage of the array substrate in the display panel. The voltage difference between the second common voltage and the first common voltage is the reference voltage for the deflection of the liquid-crystal molecules. It should be noted that, the voltage difference between the second common voltage and the first common voltage is the absolute value of the difference between the second common voltage and the first common voltage.

The liquid-crystal molecules in the display panel are driven to deflect by both the common voltage of the color film substrate and the common voltage of the array substrate, allowing light to pass through to achieve a normal display effect. It can be interpreted as that, the deflection of the liquid-crystal molecules is driven by the reference voltage. The size of the reference voltage affects a deflection angle of the liquid-crystal molecules, which affects the light transmission rate and in turn the display effect of the display panel.

The specific operations of the display panel screen flicker debugging method is as shown at blocks of FIG. 1.

At block S11: acquiring a refresh rate interval of the display panel, and determining a minimum refresh rate.

Specifically, the refresh rate interval of the display panel is acquired, and the minimum refresh rate is picked.

The refresh rate interval includes any of 35 Hz~240 Hz, 21 Hz~144 Hz, 17 Hz~120 Hz, 9 Hz~60 Hz and 48 Hz~144 Hz. It should be appreciated that, the refresh rate interval is not limited to the above-mentioned ones, but may also include refresh rate in other intervals. The minimum value of the refresh rate interval of the display panel is the minimum refresh rate.

It should be noted that, the refresh rate interval in the present application is determined by the System on Chip (SOC), and the refresh rate interval is determined by the minimum refresh rate that the System on Chip can support and the maximum refresh rate that the System on Chip can support. In other words, the value range from the minimum refresh rate to the maximum refresh rate is the refresh rate interval. The minimum value of the refresh rate interval is the minimum refresh rate, and the maximum value of the refresh rate interval is the maximum refresh rate. The end consumer can autonomously divide the refresh rate interval into a plurality of segments of refresh rate range values for use. The minimum value of each segment of refresh rate value range is the minimum refresh rate, and the maximum value of each segment of refresh rate value range is less than or equal to the maximum refresh rate. In other words, the minimum value of each segment of the refresh rate value range is fixed as the minimum refresh rate. In other words, the minimum refresh rate of the present application is the minimum refresh rate that the System on Chip can support.

Take a 27-inch gaming monitor as an example, the whole-machine specification specifies that it supports a refresh rate interval of 48 Hz~144 Hz, that is, the refresh rate interval is 48 Hz~144 Hz, which identifies the rate configuration of its System on Chip, the minimum refresh rate is 48 Hz, and the maximum refresh rate is 144 Hz. However, the refresh rate interval of 48 Hz~144 Hz may also include a plurality of refresh rate value ranges, which can be manually adjusted after turning on the e-sports monitor. That is, the middle part of 48 Hz~144 Hz is divided into several segments, for example nodes of the segments are at 60 Hz, 100 Hz, 120 Hz. This means that the end consumer can manually set the e-sports monitor that supports the refresh rate interval of 48 Hz~144 Hz to a monitor of 48 Hz~60 Hz or 48 Hz~100 Hz or 48 Hz~120 Hz or 48 Hz~144 Hz.

At block S12: controlling the display panel to display a flickering picture at the minimum refresh rate.

Specifically, the display panel is controlled to display the flickering picture with the minimum refresh rate. The display panel is connected to a timing controller. The timing controller pre-stores the flickering picture at the minimum refresh rate, and outputs the flickering picture at the minimum refresh rate to the display panel.

At block S13: adjusting the reference voltage, to acquire the flickering value of the flickering picture at different reference voltages.

Specifically, the reference voltage is adjusted several times, to acquire different flickering values corresponding to flickering pictures at different reference voltages. A plurality of reference voltages corresponds to a plurality of flickering values. It can be understood that, a reference voltage corresponds to a flickering value of the flickering picture. Adjusting the reference voltage once, the flickering value of the current flickering picture is acquired once.

In the present embodiment, the first common voltage is the common voltage of the color film substrate in the display panel, and the second common voltage is the common voltage of the array substrate in the display panel. The second common voltage is greater than the first common voltage.

Further, the second common voltage is kept constant, the first common voltage is adjusted to change the size of the reference voltage, and the reference voltage is ensured to be within a certain range of values, and the flickering value of the flickering picture is monitored by an optical test instrument.

In a specific embodiment, the second common voltage is kept constant, and the first common voltage is adjusted to ensure that the reference voltage is greater than or equal to 1V, and the reference voltage is less than or equal to 1.5V. That is, the second common voltage is greater than the first common voltage by 1V~1.5V.

It should be noted that, the flickering value refers to the brightness value difference between the positive polarity and the negative polarity under the flickering picture.

At block S14: determining the minimum flickering value and setting the corresponding reference voltage as the optimal reference voltage for the display panel.

Specifically, the minimum flickering value is picked, and the reference voltage corresponding to the minimum flickering value is set as the optimal reference voltage for the display panel.

It should be noted that, the display panel of the present embodiment is adapted to a monitor with a high refresh rate, for example, a high refresh rate gaming monitor. For the high refresh rate monitor, a charging time of each frame at high refresh rate and low refresh rate is the same, the difference lies in the blanking time between a positive frame and a negative frame. An excessively long blanking time will aggravate the electrical leakage of pixels and reduce the overall brightness of the display panel. Based on the electrical leakage characteristics of a thin-film transistor and the fact that the blanking time at low refresh rate is longer than that at high refresh rate, the electrical leakage at low refresh rate is correspondingly more serious. In other words, the flicker of the displayed picture of the display panel is more serious at low refresh rate. That is, the flicker of the displayed picture of the display panel at the minimum refresh rate is the most serious. In the present embodiment, when the flickering of the displayed picture is the most severe, the reference voltage corresponding to the minimum flickering value of the flickering picture is set as the optimal reference voltage, such that the flickering phenomenon of the display panel corresponding to the flickering picture with the most severe flickering is reduced, and the flickering phenomenon of the display panel at high and/or low refresh rate is reduced.

Figure 2:
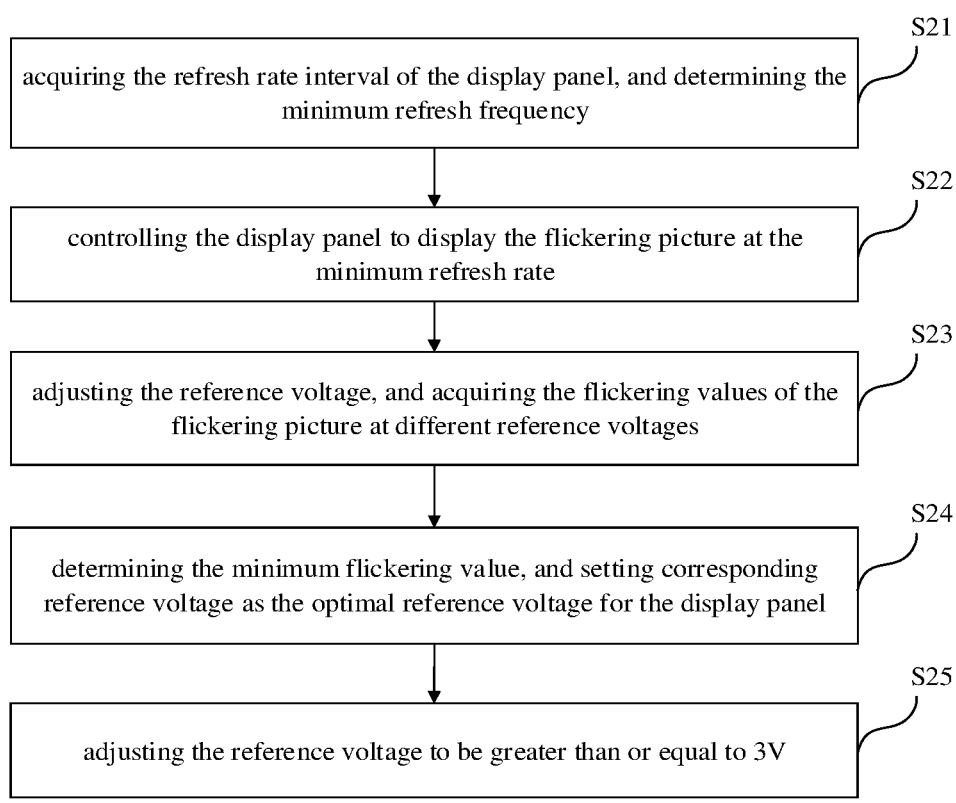
FIG. 2 is a schematic flowchart of the screen flicker debugging method of the display panel according to a second embodiment of the present application.

As shown in FIGS. 1 and 2, FIG. 2 is a schematic flowchart of the screen flicker debugging method of the display panel according to a second embodiment of the present application.

After the minimum flickering value is determined and the corresponding reference voltage is set as the optimal reference voltage for the display panel, the method further includes adjusting the reference voltage, such that the reference voltage is set to be greater than or equal to 3V, thereby further reducing the screen-flickering phenomenon of the display panel. The specific operations of the display panel screen flicker debugging method is as shown at the blocks of FIG. 2.

At block S21: acquiring the refresh rate interval of the display panel, and determining the minimum refresh rate.

The operation at block S21 is the same as that at block S11. For more details, please refer to the block S11, and no repetition will be provided here.

At block S22: controlling the display panel to display the flickering picture at the minimum refresh rate.

The operation at block S22 is the same as that at block S12. For more details, please refer to the block S11, and no repetition will be provided here.

At block S23: adjusting the reference voltage, to acquire the flickering value of the flickering picture at different reference voltages.

The operation at block S23 is the same as that at block S13. For more details, please refer to the block S11, and no repetition will be provided here.

At block S24: determining the minimum flickering value and setting the corresponding reference voltage as the optimal reference voltage of the display panel.

The operation at block S24 is the same as that at block S14. For more details, please refer to the block S11, and no repetition will be provided here.

At block S25: adjusting the reference voltage to be greater than or equal to 3V.

Specifically, the reference voltage is adjusted, such that the reference voltage is set to be greater than or equal to 3V. Adjusting the reference voltage means decreasing or increasing the reference voltage. In the present embodiment, the first common voltage is the common voltage of the color film substrate in the display panel, and the second common voltage is the common voltage of the array substrate in the display panel. The second common voltage is greater than the first common voltage.

Further, adjusting the reference voltage can be interpreted as adjusting the first common voltage and/or adjusting the second common voltage. Adjusting the first common voltage means increasing or decreasing the first common voltage. Adjusting the second common voltage means increasing or decreasing the second common voltage.

In the present embodiment, the display panel is connected to the timing controller, and the timing controller outputs the first common voltage and the second common voltage to the display panel. Keeping the first common voltage corresponding to the optimal reference voltage constant, and adjusting the second common voltage, thereby making the reference voltage to be greater than or equal to 3V. In other words, acquiring the first common voltage and the second common voltage corresponding to the optimal reference voltage, and keeping the first common voltage constant, adjusting the second common voltage, thereby making the reference voltage to be greater than or equal to 3V.

Figure 3:
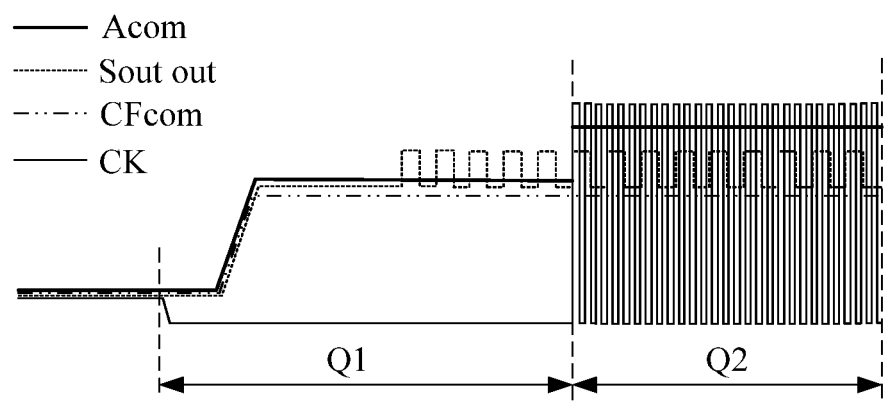
FIG. 3 is a timing diagram of a power-on process provided according to the present application.

As shown in FIG. 3, FIG. 3 is a timing diagram of a power-on process provided according to the present application.

In the present embodiment, during the power-on process, rather than adjusting the reference voltage at the instant of power-on, the second common voltage is adjusted when the display panel displays a normal picture, thereby avoiding a screen flicker phenomenon during the power-on process and damage to the display panel.

Specifically, CFcom represents the first common voltage, Acom represents the second common voltage, CK represents a clock signal, and Sout out represents an output signal. During the power-on process, the display panel includes a charging stage Q1 and a normal-picture display stage Q2. During the charging stage Q1, the clock signal is written before the first common voltage, the second common voltage and the output signal, and the clock signal is at a low level. During the charging stage Q1, the first common voltage, the second common voltage and the output signal are all at high levels after being written. During the normal-picture display stage Q2, the clock signal is at a high level, the first common voltage, the second common voltage and the output signal sustains high levels, and the second common voltage increases.

In the related art, the voltage difference between the first common voltage and the first common voltage is around 1V. That is, the reference voltage in the related art is around 1V. Adjusting the reference voltage to be greater than or equal to 3V can be interpreted as increasing the reference voltage in the related art, thereby increasing deflection angles of the liquid-crystal molecules, to increase the brightness of the display panel, and thus reducing the screen flicker phenomenon of the display panel.

It should be noted that, in the present embodiment, "A/B" or "A or B" means only A is included, or only B is included, or both A and B are included.

In a specific embodiment, the first common voltage of the display panel ranges from 4V to 6V, while the second common voltage ranges from 9.8V to 12V.

Based on the electrical leakage characteristics of thin-film transistors (TFTs), when the blanking time at low refresh rates is significantly longer than that at high refresh rates, correspondingly, the electrical leakage at relatively low refresh rates is also more severe. Electrical leakage leads to a decrease in the level of high level, which is eventually reflected in a decrease in the brightness of the displayed image. For example, when the high refresh rate monitor is at high refresh rate, the brightness of the same displayed picture is L1, after the rate is converted to a low refresh rate, due to TFT electrical leakage at low rate, the brightness of the same displayed picture decreases to L2. At this time, the brightness difference between the high refresh rate and the low refresh rate is ΔL=L1−L2. If at this point, the high refresh rate monitor operates rapidly at high and low refresh rates, the display panel flicker phenomenon becomes apparent. While in the present embodiment, on the basis that, the reference voltage corresponding to the minimum flickering value of the flickering picture with the most severe flicker of the displayed picture is adopted as the optimal reference voltage, to improve the flicker phenomenon of the display panel, the common voltage of the array substrate is further increased (i.e., the second common voltage is increased), so as to increase the reference voltage for the deflection of the liquid-crystal molecules, which in turn increases deflection angles of the liquid-crystal molecules, such that the light from the back-light source in the high refresh rate monitor would pass through the liquid-crystal panel in a relatively larger amount, thereby reducing the brightness difference between the high refresh rate and the low refresh rate. In this way, the overall brightness of the high refresh rate monitor is increased, and the screen flicker phenomenon of the display panel is reduced.

The present application provides the screen flicker debugging method of the display panel. The display panel includes the first common voltage and the second common voltage. The voltage difference between the second common voltage and the first common voltage is configured as the reference voltage for deflection of the liquid-crystal molecules. The screen flicker debugging method of the display panel includes: acquiring the refresh rate interval of the display panel, and determining the minimum refresh rate: controlling the display panel to display the flickering picture at the minimum refresh rate: adjusting the reference voltage to acquire the flickering value of the flickering picture at different reference voltages; and determining the minimum flickering value and setting the corresponding reference voltage as the optimal reference voltage for the display panel. The reference voltage corresponding to the minimum flickering value of the flickering picture with the most severe flickering of the displayed picture (i.e., the flickering picture displayed at the minimum refresh rate) is set as the optimal reference voltage, such that the flickering phenomenon of the display panel corresponding to the flickering picture with the most severe flickering is reduced, and the flickering phenomenon of the display panel at high and low refresh rates is reduced.

Figure 4:
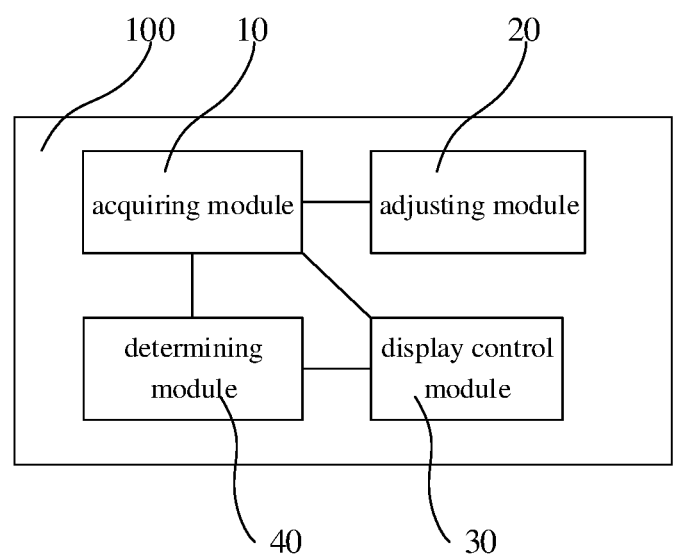
FIG. 4 is a schematic modular diagram of a screen flicker debugging apparatus for a display panel according to an embodiment of the present application.

As shown in FIG. 4, FIG. 4 is a schematic modular diagram of a screen flicker debugging apparatus for the display panel according to an embodiment of the present application.

The present application provides a screen flicker debugging apparatus 100 for the display panel. The screen flicker debugging apparatus 100 of the display panel is configured to implement the above-mentioned screen flicker debugging method of the display panel.

The screen flicker debugging apparatus 100 of the display panel includes an acquiring module 10, an adjusting module 20, a display control module 30 and a determining module 40.

The acquiring module 10 is configured for acquiring the first common voltage and the second common voltage of the display panel. The voltage difference between the second common voltage and the first common voltage is configured as the reference voltage for deflection of the liquid-crystal molecules. The acquiring module 10 is further configured for acquiring the refresh rate interval of the display panel, and acquiring the flickering value of the flickering picture at different reference voltages. It should be appreciated that, the acquiring module 10 is further configured for acquiring the minimum refresh rate that can be supported by the display panel.

The display control module 30 is configured for controlling the display panel to display the flickering picture at the minimum refresh rate. It should be appreciated that, the display control module 30 is further configured for controlling the display panel to display a picture.

The adjusting module 20 is configured for adjusting the reference voltage. Specifically, the adjusting module 20 is configured for adjusting the first common voltage and/or the second common voltage. The determining module 40 is configured for determining the minimum refresh rate, and further configured for determining the minimum flickering value, and setting the corresponding reference voltage as the optimal reference voltage of the display panel.

Figure 5:
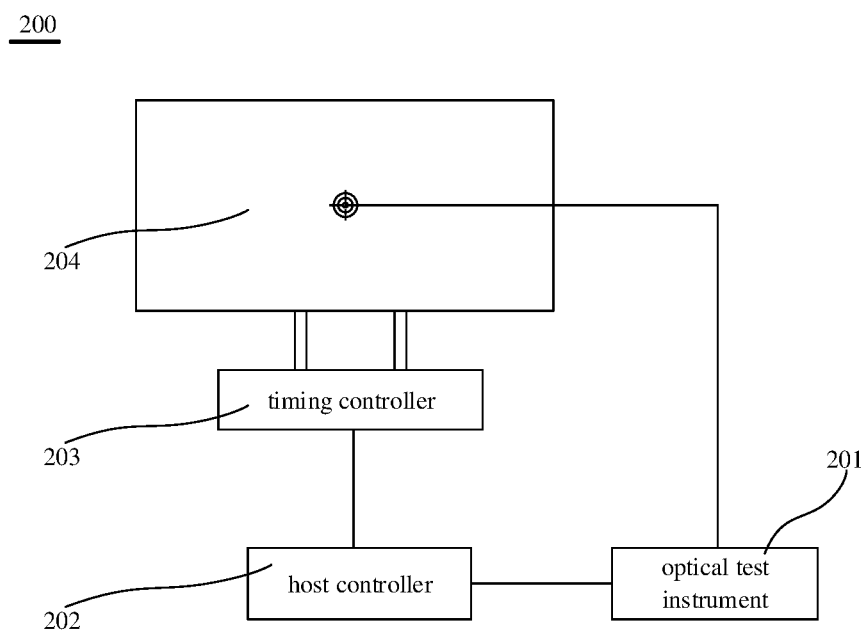
FIG. 5 is a schematic modular diagram of a screen flicker debugging system for a display panel according to an embodiment of the present application.

As shown in FIG. 5, FIG. 5 is a schematic modular diagram of a screen flicker debugging system for the display panel according to an embodiment of the present application.

The present application provides a screen flicker debugging system 200 of the display panel. The screen flicker debugging system 200 of the display panel includes an optical test instrument 201 and a host controller 202. The optical test instrument 201 is configured for calculating the flickering value of the display panel 204. The host controller 202 is configured for implementing the above-mentioned screen flicker debugging method of the display panel 204.

The optical test instrument 201 is aimed at a middle region of the display panel 204, to monitor the flickering value of the flickering picture of the display panel 204.

The host controller 202 is connected to the display panel 204 through the timing controller 203, and is configured for implementing the above-mentioned screen flicker debugging method of the display panel 204.

The above are only embodiments of the present disclosure, and do not limit the patent scope of the present application. Any equivalent changes to the structure or processes made by the description and drawings of this application or directly or indirectly used in other related technical field are included in the protection scope of this application.

What is claimed is:

1. A screen flicker debugging method for a display panel, the display panel comprising a first common voltage and a second common voltage, a voltage difference between the second common voltage and the first common voltage being configured as a reference voltage for deflection of liquid-crystal molecules, the method comprising:
   acquiring a refresh rate interval of the display panel, and determining a minimum refresh rate;
   controlling the display panel to display a flickering picture at the minimum refresh rate;
   adjusting the reference voltage, and acquiring flickering values of the flickering picture at different reference voltages; and
   determining a minimum flickering value, and setting corresponding reference voltage as an optimal reference voltage for the display panel.

2. The screen flicker debugging method for the display panel as claimed in claim 1, wherein
   the adjusting the reference voltage, and acquiring the flickering values of the flickering picture at different reference voltages comprises:
   keeping the second common voltage constant, adjusting the first common voltage, and acquiring the flickering values of the flickering picture at different reference voltages;
   wherein, the first common voltage is a common voltage of a color film substrate of the display panel, and the second common voltage is a common voltage of an array substrate of the display panel.

3. The screen flicker debugging method for the display panel as claimed in claim 1, wherein
   after the determining the minimum flickering value, and setting the corresponding reference voltage as the optimal reference voltage for the display panel, the method further comprises:
   adjusting the reference voltage to be greater than or equal to 3V.

4. The screen flicker debugging method for the display panel as claimed in claim 3, wherein
the adjusting the reference voltage to be greater than or equal to 3V comprises:
keeping the first common voltage corresponding to the optimal reference voltage constant, adjusting the second common voltage, and making the reference voltage to be greater than or equal to 3V;
wherein, the first common voltage is a common voltage of a color film substrate of the display panel, and the second common voltage is a common voltage of an array substrate of the display panel.

5. The screen flicker debugging method for the display panel as claimed in claim 4, wherein
adjusting the second common voltage when the display panel displays a normal picture during a power-on process.

6. The screen flicker debugging method for the display panel as claimed in claim 4, wherein
the first common voltage ranges from 4V to 6V, and the second common voltage ranges from 9.8V to 12V.

7. The screen flicker debugging method for the display panel as claimed in claim 4, wherein
the acquiring the refresh rate interval of the display panel, and determining the minimum refresh rate comprises:
acquiring the refresh rate interval of the display panel, wherein, a minimum value of the refresh rate interval is the minimum refresh rate.

8. The screen flicker debugging method for the display panel as claimed in claim 1, wherein
the refresh rate interval comprises any of 35 Hz~240 Hz, 21 Hz~144 Hz, 17 Hz~120 Hz, 9 Hz~60 Hz and 48 Hz~144 Hz.

9. A screen flicker debugging method for a display panel, the display panel comprising a first common voltage and a second common voltage, a voltage difference between the second common voltage and the first common voltage being configured as a reference voltage for deflection of liquid-crystal molecules, the method comprising:
acquiring a refresh rate interval of the display panel, and determining a minimum refresh rate;
controlling the display panel to display a flickering picture at the minimum refresh rate;
adjusting the reference voltage, and acquiring flickering values of the flickering picture at different reference voltages, comprising:
keeping the second common voltage constant, adjusting the first common voltage, and acquiring the flickering values of the flickering picture at different reference voltages;
determining a minimum flickering value, and setting corresponding reference voltage as an optimal reference voltage for the display panel, and
adjusting the reference voltage to be greater than or equal to 3V.

10. The screen flicker debugging method as claimed in claim 9, wherein
the first common voltage is a common voltage of a color film substrate of the display panel, and the second common voltage is a common voltage of an array substrate of the display panel.

11. The screen flicker debugging method as claimed in claim 10, wherein
the adjusting the reference voltage to be greater than or equal to 3V comprises:
keeping the first common voltage corresponding to the optimal reference voltage constant, adjusting the second common voltage, and making the reference voltage to be greater than or equal to 3V.

* * * * *